April 18, 1950
R. T. COWAN
2,504,304
FLUID FLOW CONTROL SYSTEM
Filed July 1, 1947
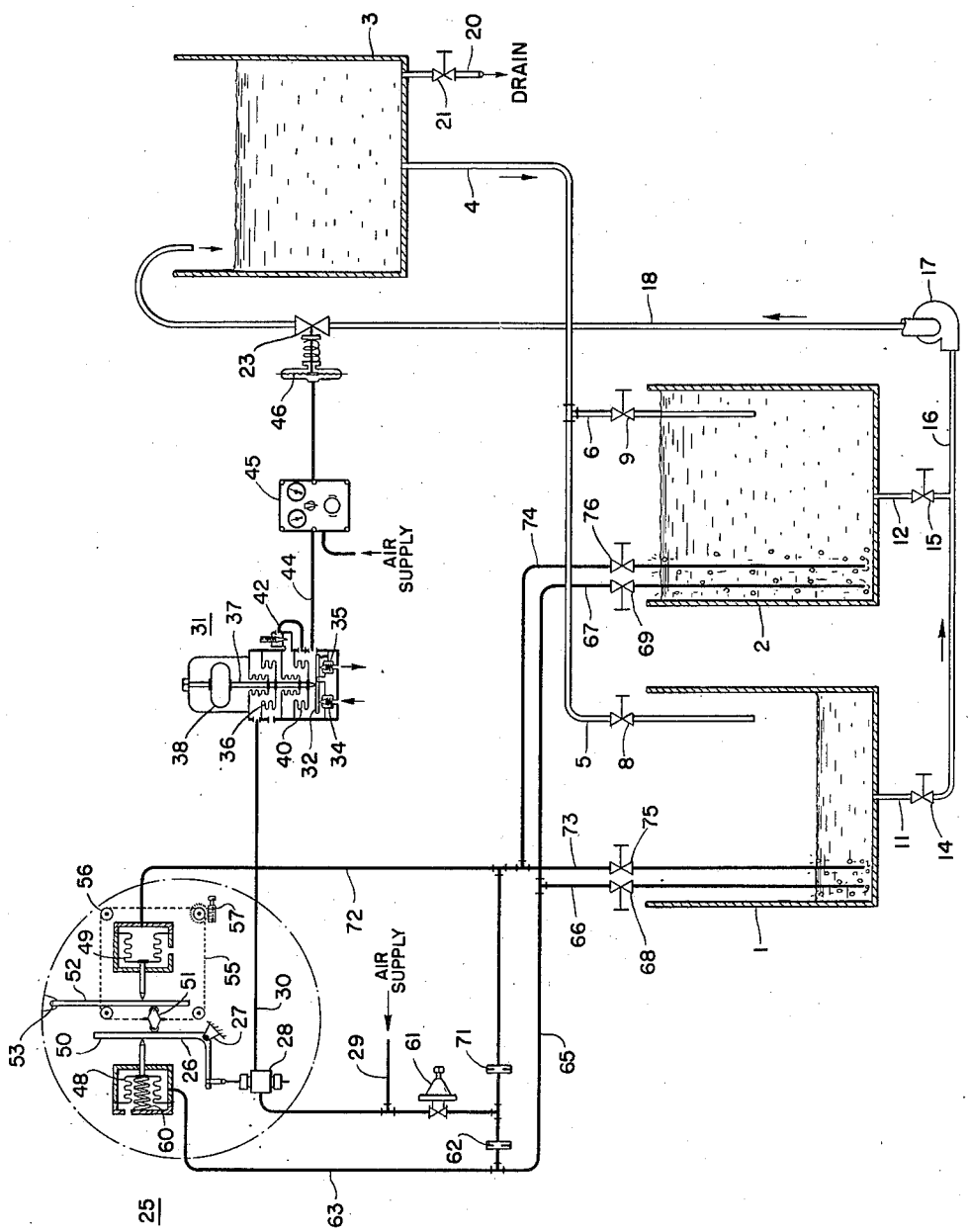
INVENTOR.
RALPH T. COWAN
BY
Raymond D. Jenkins
ATTORNEY Patented Apr. 18, 1950

2,504,304

UNITED STATES PATENT OFFICE 2,504,304

FLUID FLOW CONTROL SYSTEM

Ralph T. Cowan, Detroit, Mich., assignor to Bailey Meter Company, a corporation of Delaware Application July 1, 1947, Serial No. 758,255

9 Claims. (Cl. 137—68)

This invention relates to fluid flow control systems and more particularly to systems which operate automatically to maintain a constant ratio between the rates of fluid flow in different conduits.

In the treatment of certain liquids or solutions, it is necessary at times that they be passed simultaneously through separate conduits, and it is necessary that the ratio of the rates of flow in the conduits be maintained at a constant value. A system for maintaining a constant ratio between the rates of fluid flow in different conduits may desirably include a device subject to pressures representative of the rates of flow and operative when the ratio of the flow rates changes to regulate the flow in one of the conduits until the ratio is returned to the desired value. Where the liquid is being removed from one container through one conduit while it is being supplied to a second container through another conduit, bubbler pipes may be suspended in the containers and connected to the device to subject it to balanced pressures as long as the ratio of change in the liquid levels remain constant. By providing a valve in one of the conduits and connecting it to the device for actuation by the latter when unbalanced, there may be obtained a regulation of the flow so as to maintain a change in the liquid levels at a constant ratio. If the cross sectional areas of the containers throughout the range of level change remain constant, then the ratio of the rates of flow in the conduits will also remain constant.

An object of my invention is to provide an improved system for maintaining the ratio of fluid flow between different points at a constant value. Another object is to provide an improved system which operates to maintain the ratio between the rate of liquid flow from one container and the rate of liquid supply to another container, at a constant value. Yet another object is to provide a system having a device subject to pressures representative of liquid levels in separate containers and operative to control the flow of liquid relative to one of the containers so that the level therein changes at a rate inversely proportional to the rate of change in level at the other container. Other objects will appear in the course of the following description.

In the accompanying drawing there is shown for purposes of illustration, one form which my invention may assume in practice. In this drawing, the single figure is a schematic diagram of my improved control system.

Referring to the drawing it will be noted that the system is shown controlling the flow of liquid between tanks 1, 2 and 3. Liquid in tank 3 may be conducted by gravity through a conduit 4 to branch conduits 5 and 6 having manually operated valves 8 and 9 and opening into tanks 1 and 2, respectively. The lower ends of the tanks 1 and 2 are connected by conduits 11 and 12, through manually operated valves 14 and 15, to a conduit 16 which communicates with a pump 17 discharging through a conduit 18 into the tank 3. Tank 1 is shown containing only a small amount of liquid while tanks 2 and 3 are shown more nearly full. The liquid in tank 3 is treated and then drained to tank 1 while the liquid in tank 2 is pumped to tank 3 for treatment. If desired, there may be other tanks arranged like tanks 1—2 and connectable selectively for receiving liquid from or supplying liquid to tank 3. If desired, conduit 4 may be connected to a source of liquid supply other than tank 3 so that liquid may be supplied to tank 1 for treatment while the liquid in tank 2 is being supplied to tank 3 for further treatment. The liquid may then be drained from tank 3 through a conduit 20 having a manually operated valve 21. Tank 2 may then be connected to the supply while liquid is discharged from tank 1 to tank 3. Conduit 18 may discharge, if desired, to any point. My control system operates to regulate the flow of liquid through the discharge conduit 18 so that the ratio of the rates of flow in conduits 4 and 18 is maintained constant regardless of the points to which these conduits are connected.

The control of liquid flow in conduit 18 is obtained by connecting a valve 23 in the conduit and positioning it in response to pressures which vary with the ratio of liquid levels in tanks 1 and 2. The control pressures for the valve 23 are determined by a device 25 having a bell-crank 26 pivotally supported at 27 and connected to a pilot valve 28 for regulating the flow of pressure fluid from a supply conduit 29 to a conduit 30 leading to a relay 31 of the type disclosed in the patent Re. 21,804 issued to H. H. Gorrie on May 20, 1941. This relay includes a beam 32 pivoted between its ends and operative from a neutral position to unseat either a fluid inlet valve 34 or an exhaust valve 35. A diaphragm 36 is acted upon by fluid pressure from conduit 30 and tends to move a member 37 downwardly against the action of a spring 38 for unseating the valve 34. A diaphragm 40 is connected to the member 37 and has chambers at its opposite sides communicating with each other through a restricted passage means 42. The chamber at the lower side of diaphragm 40 communicates with the fluid supply and exhaust under the control of valves 34, 35, and is connected through a conduit 44 and a selector valve 45 to a diaphragm 46 for actuating the valve 23. The relay 31 operates to maintain a constant pressure on diaphragm 46 as long as the forces exerted on the member 37 by the diaphragm 36 and the spring 38 are balanced. Upon an unbalance of these forces, the pressure on diaphragm 46 is continuously increased or decreased depending upon the direction of unbalance.

The bell-crank lever 26 is positioned about its pivot 27 by pressure responsive devices 48, 49, the device 48 acting directly against an arm 50 of the bell-crank and the device 49 acting against the opposite side of the arm 50 through an adjustable fulcrum 51 and a lever 52 pivotally supported at 53. A chain 55 is shown herein connected to the fulcrum 51 and extending about guides 56 for movement by a manually operated member 57. The pressure responsive device 48 is urged by a spring 60 toward the bell-crank arm 50, and is urged in the opposite direction by pressure fluid supplied from conduit 29 through a pressure reducing valve 61, an orifice 62 and a conduit 63. The discharge side of the orifice 62 is also connected through a conduit 65 to branch conduits 66 and 67 opening into the tanks 1 and 2 near the lower ends of the latter, and connected in the branch conduits are manually operated valves 68 and 69. The pressure responsive device 49 has pressure fluid supplied thereto from the conduit 29 through the reducing valve 61, an orifice 71 and a conduit 72. The discharge side of the orifice 71 is also connected through branch conduits 73, 74 to points near the lower ends of the tanks 1, 2, and connected in the branch conduits 73, 74 are manually operated valves 75 and 76.

Assuming that there is liquid in the tanks as shown and it is desired to drain liquid from tank 3 to tank 1 while liquid in tank 2 is supplied to tank 3 at the same rate, then valves 8, 15, 68 and 76 will be opened while the other valves remain closed. Air will then pass through conduit 66 and bubble up through the liquid in tank 1. The fluid pressure acting on the device 48 is determined by the resistance to the flow of air from conduit 66, and, with a low liquid level as shown, the resistance to the escape of air will be correspondingly low. The device 48 will be subjected to a low pressure tending to move it away from the lever arm 50, and the spring 60 will easily overcome this pressure and tend to swing the arm 50 in a clockwise direction. The pressure responsive device 49 will be subjected to a comparatively high fluid pressure because the liquid in tank 2 will offer a high resistance to the escape of air from conduit 74, and this device will act through lever 52 and fulcrum 51 to urge the lever 26 in a counter-clockwise direction. The lever 26 will assume a position depending upon the opposing pressures, and the connection between the lever and the pilot valve will be adjusted when the pressures are balanced so that the pressure supplied through the conduit 30 to the diaphragm 36 will balance the spring 38. A predetermined pressure will then be supplied from the relay 31 through conduit 44 to the diaphragm 46 for holding the valve 23 in a partially open position.

As the liquid level in tank 1 rises, the fluid pressure on the device 48 increases and reduces the force exerted by the spring 60 on lever arm 50. The dropping of the liquid level in tank 2 results in a decreasing pressure on the device 49.

As long as the opposing pressures on the arm 50 are balanced, the pressure supplied to diaphragm 46 remains constant. If the liquid level in tank 1 rises more rapidly than the level in tank 2 drops, then the forces on the arm 50 become unbalanced so as to swing the lever 26 in a counter-clockwise direction. The pilot valve 28 is positioned by the lever to reduce the pressure supplied to the relay 31 so that the latter operates to effect a continuous reduction in the pressure supplied to the diaphragm 46. The valve 23 then moves toward its open position and permits the pump 17 to discharge a greater quantity of liquid through conduit 18 until the liquid level in tank 2 drops to a point at which the pressures exerted on opposite sides of the lever arm 50 are again balanced. If the level in tank 2 drops faster than the level in tank 1 rises, the pressures on lever 26 become unbalanced so as to increase the pressure supplied to relay 51 and effect an increase in the pressure acting on the diaphragm 46 for moving the valve 23 toward its closed position.

When it is desired to drain the liquid to tank 2 and to pump the liquid from tank 1, it is only necessary to open valves 9, 14, 69 and 75 while the other valves are left closed. To change the ratio between the rates of fluid flow through conduits 4 and 18, it is only necessary to change the position of the fulcrum 51 by the hand operated knob 57.

While there is described in this application one form which my invention may assume in practice, it will be understood that it may be modified and embodied in various other forms without departing from its spirit or the scope of the appended claims.

What I claim as new, and desire to secure by Letters Patent of the United States, is:

1. A liquid flow control system comprising, in combination, a plurality of receptacles adapted to contain liquid, liquid supply and discharge conduits, means for connecting said conduits selectively in communication with said receptacles, pressure responsive valve means for controlling the flow of liquid in one of said conduits, and means for subjecting said valve means to a pressure varying in response to variations in the change of ratio of the liquid levels in said receptacles connected to said supply and discharge conduits.

2. A liquid flow control system comprising, in combination, a plurality of receptacles adapted to contain liquid, liquid supply and discharge conduits, means for connecting said conduits selectively in communication with said receptacles, pressure responsive valve means for controlling the flow of liquid in one of said conduits, means including a member movable in opposite directions for controlling the supply of pressure fluid from a source to said valve means, means for yieldingly urging said member in one direction, pressure responsive means for opposing movement of said member by said yielding means, and means for subjecting said last mentioned means to pressures proportional to the total of the liquid levels in said receptacles connected to said supply and discharge conduits.

3. A liquid flow control system comprising, in combination, a plurality of receptacles adapted to contain liquid, liquid supply and discharge conduits, means for connecting said conduits selectively in communication with said receptacles, pressure responsive valve means for controlling the flow of liquid in one of said conduits, means including a member movable in opposite directions for controlling the supply of pressure fluid from a source to said valve means, means for yieldingly urging said member in one direction, pressure responsive devices for opposing the movement of said member by said yielding means, means for subjecting one of said devices to a pressure proportional to the liquid level in the one of said receptacles connected to said discharge conduit, and means for subjecting another of said devices to a pressure proportional to the liquid level in the one of said receptacles connected to said supply conduit.

4. A liquid flow control system comprising, in combination, a plurality of receptacles adapted to contain liquid, liquid supply and discharge conduits, means for connecting said conduits selectively in communication with said receptacles, pressure responsive valve means for controlling the flow of liquid in one of said conduits, means including a member movable in opposite directions for controlling the supply of pressure fluid from a source to said valve means, means for yieldingly urging said member in one direction, pressure responsive devices for opposing movement of said member by said yielding means, and means for subjecting said devices to pressures proportional to the liquid levels in said receptacles connected to said supply and discharge conduits, said last mentioned means including bubbler pipes opening into said receptacles and communicating with a source of pressure fluid and with said devices.

5. A liquid flow control system comprising, in combination, a plurality of receptacles adapted to contain liquid, liquid supply and discharge conduits, means for connecting said conduits selectively in communication with said receptacles, pressure responsive valve means for controlling the flow of liquid in one of said conduits, means including a member movable in opposite directions for controlling the supply of pressure fluid from a source to said valve means, means for yieldingly urging said member in one direction, pressure responsive devices for opposing movement of said member by said yielding means, and means for subjecting said devices to pressures proportional to the liquid levels in said receptacles connected to said supply and discharge conduits, said last mentioned means including conduits connecting said devices in communication with said receptacles and communicating through separate orifices with a source of pressure fluid.

6. A liquid flow control system comprising, in combination, a plurality of receptacles adapted to contain liquid, liquid supply and discharge conduits, means for connecting said conduits selectively in communication with said receptacles, pressure responsive valve means for controlling the flow of liquid in one of said conduits, means including a lever for controlling the supply of pressure fluid from a source to said valve means, means for yieldingly urging said lever in one direction, a pressure responsive device for opposing said yielding means, means for subjecting said device to a fluid pressure proportional to the level of the liquid in one of said receptacles to which said conduits are connected, means including a pressure responsive device for opposing movement of said lever by said yielding means, said last mentioned means being adjustable to act on said lever at different points along its length, and means for subjecting said last mentioned device to a fluid pressure proportional to the level of the liquid in another of said receptacles to which said conduits are connected.

7. A liquid flow control system comprising, in combination, a plurality of receptacles adapted to contain liquid, liquid supply and discharge conduits connected in communication with said receptacles, pressure responsive valve means for controlling the flow of liquid in one of said conduits, means including a member movable in opposite directions for controlling the supply of pressure fluid from a source to said valve means, means for applying a constant force to said member for urging it in one direction, and means for urging said member in the opposite direction by a force responsive to variations in the change of ratio of the liquid levels in said receptacles.

8. The system of claim 7 in which said last mentioned means includes pressure responsive devices acting on said member, and bubbler pipes opening into said receptacles and communicating with said devices and with a source of pressure fluid.

9. A liquid flow control system comprising, in combination, a plurality of receptacles adapted to contain liquid, liquid supply and discharge conduits, means for connecting sadi conduits selectively in communication with said receptacles, pressure responsive valve means for controlling the flow of liquid in said discharge conduit, and means for subjecting said valve means to a pressure varying in response to variations in the change of ratio of the liquid levels in said receptacles connected to said supply and discharge conduits.

RALPH T. COWAN.

REFERENCES CITED

The following references are of record in the file of this patent:

UNITED STATES PATENTS

| Number | Name | Date |
| --- | --- | --- |
| 1,318,676 | Lawrence | Oct. 14, 1919 |
| 1,354,311 | Landrum | Sept. 28, 1920 |
| 1,851,422 | Durando | Mar. 29, 1932 |